United States Patent [19]
Boulay et al.

[11] Patent Number: 6,108,799
[45] Date of Patent: Aug. 22, 2000

[54] AUTOMATED SAMPLE CREATION OF POLYMORPHIC AND NON-POLYMORPHIC MARCRO VIRUSES

[75] Inventors: Jean-Michel Yann Boulay, Marseilles, France; August T. Petrillo, Bedford; Morton Gregory Swimmer, Chappaqua, both of N.Y.

[73] Assignee: International Business Machines Corporation, Armonk, N.Y.

[21] Appl. No.: 09/041,493

[22] Filed: Mar. 12, 1998

Related U.S. Application Data

[60] Provisional application No. 60/066,382, Nov. 21, 1997.

[51] Int. Cl.[7] .............................. G06F 11/00; G06F 13/00
[52] U.S. Cl. ........................... 714/38; 713/200; 713/201; 714/26; 717/4
[58] Field of Search ..................................... 713/200, 201; 380/3, 4; 714/28, 26, 33, 41; 703/22

[56] References Cited

U.S. PATENT DOCUMENTS

| | | | |
|---|---|---|---|
| 5,398,196 | 3/1995 | Chambers ................................ | 364/580 |
| 5,440,723 | 8/1995 | Arnold et al. ........................... | 395/181 |
| 5,452,442 | 9/1995 | Kephart .............................. | 395/183.14 |
| 5,485,575 | 1/1996 | Chess et al. ........................ | 395/183.14 |
| 5,572,590 | 11/1996 | Chess ........................................... | 380/4 |
| 5,613,002 | 3/1997 | Kephart et al. ............................. | 380/4 |
| 5,826,013 | 10/1998 | Nachenberg ............................ | 713/201 |
| 5,842,002 | 11/1998 | Schnurer et al. ......................... | 703/21 |
| 5,951,698 | 9/1999 | Chen et al. ................................. | 714/38 |
| 5,978,917 | 11/1999 | Chi .......................................... | 713/201 |
| 6,016,546 | 1/2000 | Kephart et al. ......................... | 713/200 |
| 6,021,510 | 2/2000 | Nachenberg .............................. | 714/38 |
| 6,026,502 | 2/2000 | Wakayama ................................ | 714/38 |

OTHER PUBLICATIONS

Symantec, Understanding Heuristics: Symantec's Bloodhound technology, Sep. 1997, www.symantec.com, pp. 1–14.

*An Immune System for Cyberspace* by Jeffrey O. Kephart et al. in IEEE, 1997, pp. 879–884 *Biologically Inspired defenses Against Computer Viruses* J. Kephart et al, at High Integrity Computing Laboratory at IBM Thomas J. Watson Research Center, Yorktown Heights, NY 10598, pp. 985–996.

(List continued on next page.)

*Primary Examiner*—Robert W. Beausoliel, Jr.
*Assistant Examiner*—James G. Weir
*Attorney, Agent, or Firm*—Ohlandt, Greeley, Ruggiero & Perle, LLP

[57] ABSTRACT

Disclosed is a system and method for automatically generating at least one instance of a computer macro virus that is native to or associated with an application. The method includes steps of (a) providing a suspect virus sample; and (b) replicating the suspect virus sample onto a least one goat file, using at least one of simulated user input or interprocess communication commands for exercising the goat file through the application, to generate an infected goat file. A further step can be executed of (c) replicating the infected goat file onto a least one further goat file, using at least one of simulated user input, such as keystrokes, mouse clicks and the like, or interprocess communication commands, to generate an additional instance of an infected goat file. The step of providing includes a step of determining attributes of the suspect virus sample, and the steps of exercising employ simulated user input or interprocess communication commands that are selected based at least in part on the determined attributes. As a parallel process the steps of exercising include steps of detecting an occurrence of a window, such as a pop-up window that is opened by one of the application or the macro virus; and using at least one of simulated user input or interprocess communication command(s) for closing the opened window. In this manner the replication process is not halted by a window that requires input from a user.

20 Claims, 7 Drawing Sheets

OTHER PUBLICATIONS

J. O. Kephart et al., "Blueprint for a Computer Immune System", Presented at the Virus Bulleting International Conference in San Fransisco, Oct. 1–3, 1997., 14 Pages, <URL :http://www.av.ibm.com/InsideTheLab/Bookshelf/Scientific Papers/Kephart/VB97>.

"Method of Rule–Based File, Window, and Messages Processing", IBM Technical Disclosure Bulletin, vol. 38, No. 7, Jul. 1995.

Vesselin Bontchev, "Possible macro virus attacks and how to prevent them", Computers & Security, vol. 15, No. 7, pp. 596–626, (1996).

```
                        START
                          │
                          ▼
              ┌─────────────────────┐      ┌──────────────────┐
              │ DETERMINE ATTRIBUTES│──1.1─▶│ SAMPLE ATTRIBUTES│
              │ OF THE SAMPLE DOC   │      └──────────────────┘
              └─────────────────────┘
                          │ 1.2
                          ▼
          YES    ◇ IS SAMPLE TYPE ◇   NO       ┌──────────────────┐        ┌──────────────┐
       ┌─────────   KNOWN?          ─────────▶ │ ASSUME THE SAMPLE│  (1-A)─▶│ ASSUME THE   │
       │                                       │ IS A DOCUMENT    │        │ VIRUS SAMPLE │
       │      [SEE FIG.7]                      └──────────────────┘        │ IS A GLOBAL  │
  1.3  ▼                                                │ 1.4                │ TEMPLATE     │
  ┌──────────┐                                  ┌──────────┐                └──────────────┘
  │ REPLICATE│                                  │ REPLICATE│                      │ 1.6
  │ SAMPLE   │                                  │ SAMPLE   │                ┌──────────┐
  └──────────┘                                  └──────────┘                │ REPLICATE│
       │ 1.9                                         │ 1.5                  │ SAMPLE   │
       ▼                                             ▼                      └──────────┘
   ◇ DID WE  ◇  YES                           ◇ DID WE  ◇  YES    YES             │ 1.7
   PRODUCE      ─────┐                        PRODUCE     ──────────────▶    ◇ DID WE ◇
   INFECTED          │                        INFECTED                       PRODUCE
   GOATS?            │                        GOATS?                         INFECTED
       │ NO          │                            │ NO                       GOATS?
       │             │                          (1-A)                           │ NO
       │             │                                                          │
       │        ┌────┴──────────────────────────────┐                           │
       │        ▼                                    ▼                          │
       │   1.11 ◇ ARE THERE ◇    NO     ◇ ARE THERE ◇  1.10                    │
       │  YES   INFECTED GOATS ◀─────── ENOUGH INFECTED                         │
       │ ┌───── LEFT?                    GOATS?                                 │
       │ │         │ NO                      │ YES                              │
       │ │  1.12   ▼                         ▼                                  │
       │ │ ┌─────────────┐               ┌─────┐                                │ 1.8
       │ │ │ CHOOSE AN   │               │ END │                          ┌──────────────┐
       │ │ │ INFECTED    │               └─────┘                          │ MANUAL       │
       └─┼▶│ GOAT AS NEW │                                                │ ANALYSIS     │
         │ │ VIRUS SAMPLE│                                                │ NEEDED       │
         │ │ AND NOTE    │                                                └──────────────┘
         │ │ ITS NATURE  │
         │ └─────────────┘
```

FIG. 1  GLOBAL REPLICATION PROCESS

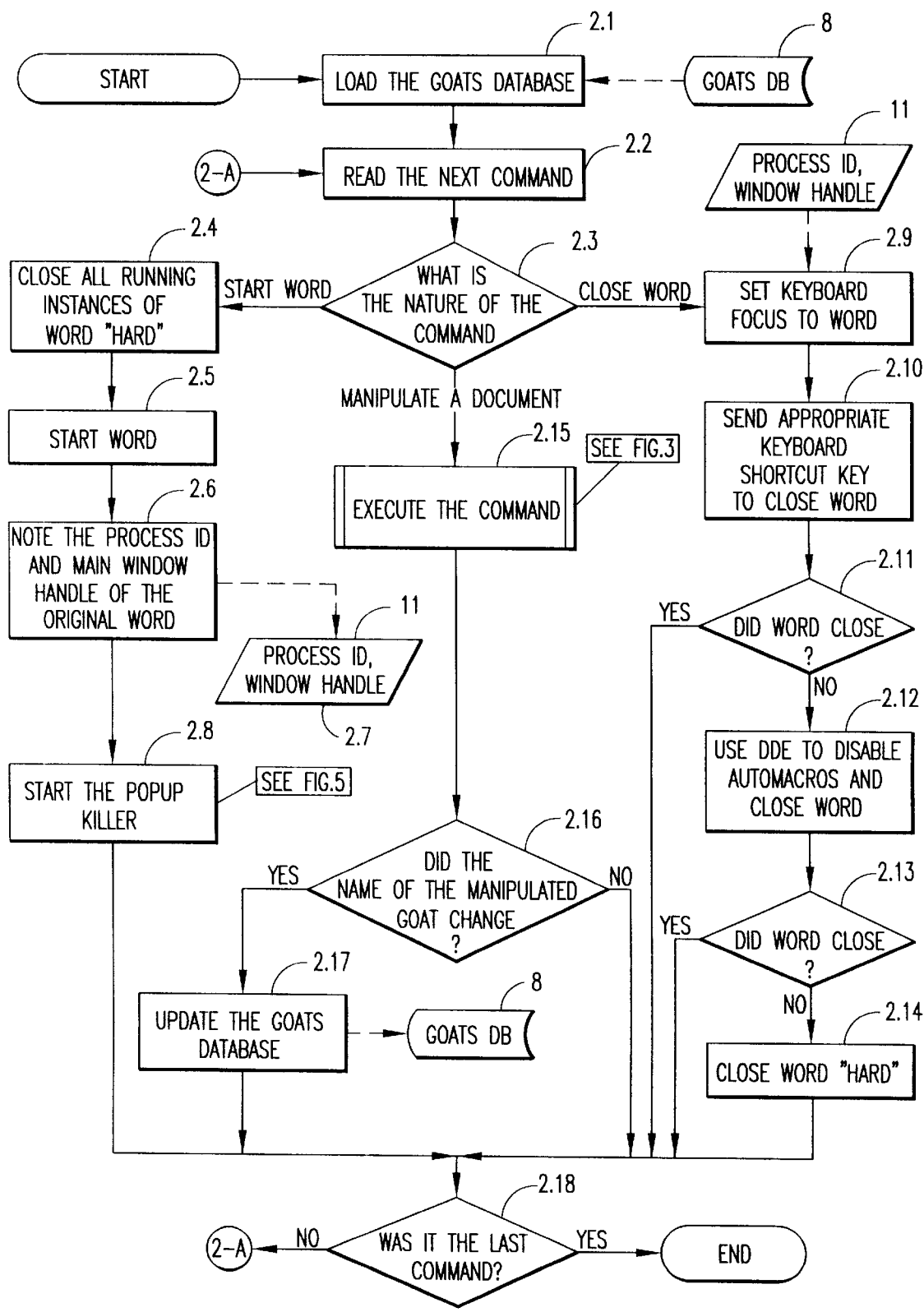
FIG.2　　PROCESSING A COMMAND FILE

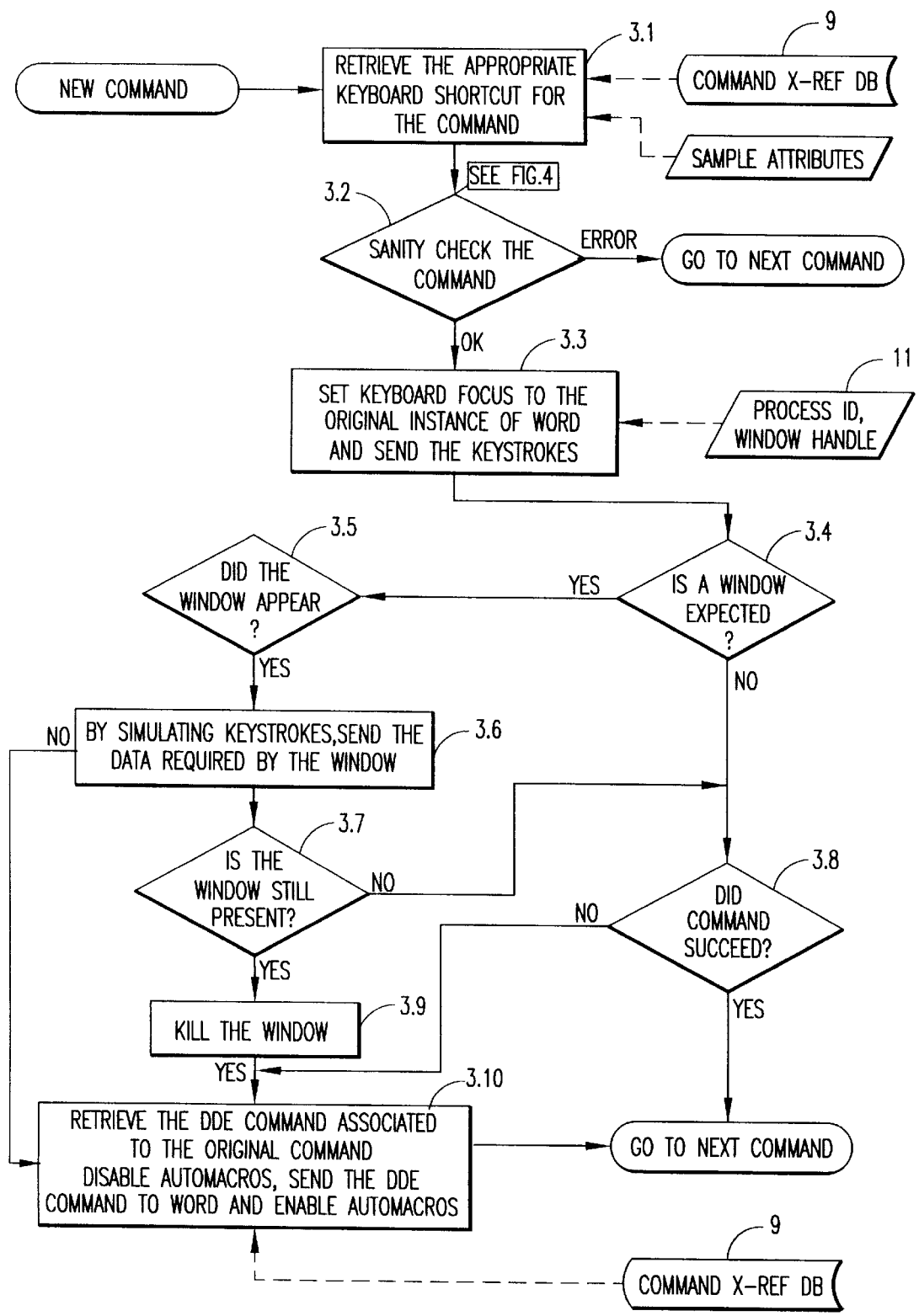
FIG.3 EXECUTION OF A FILE MANIPULATION COMMAND

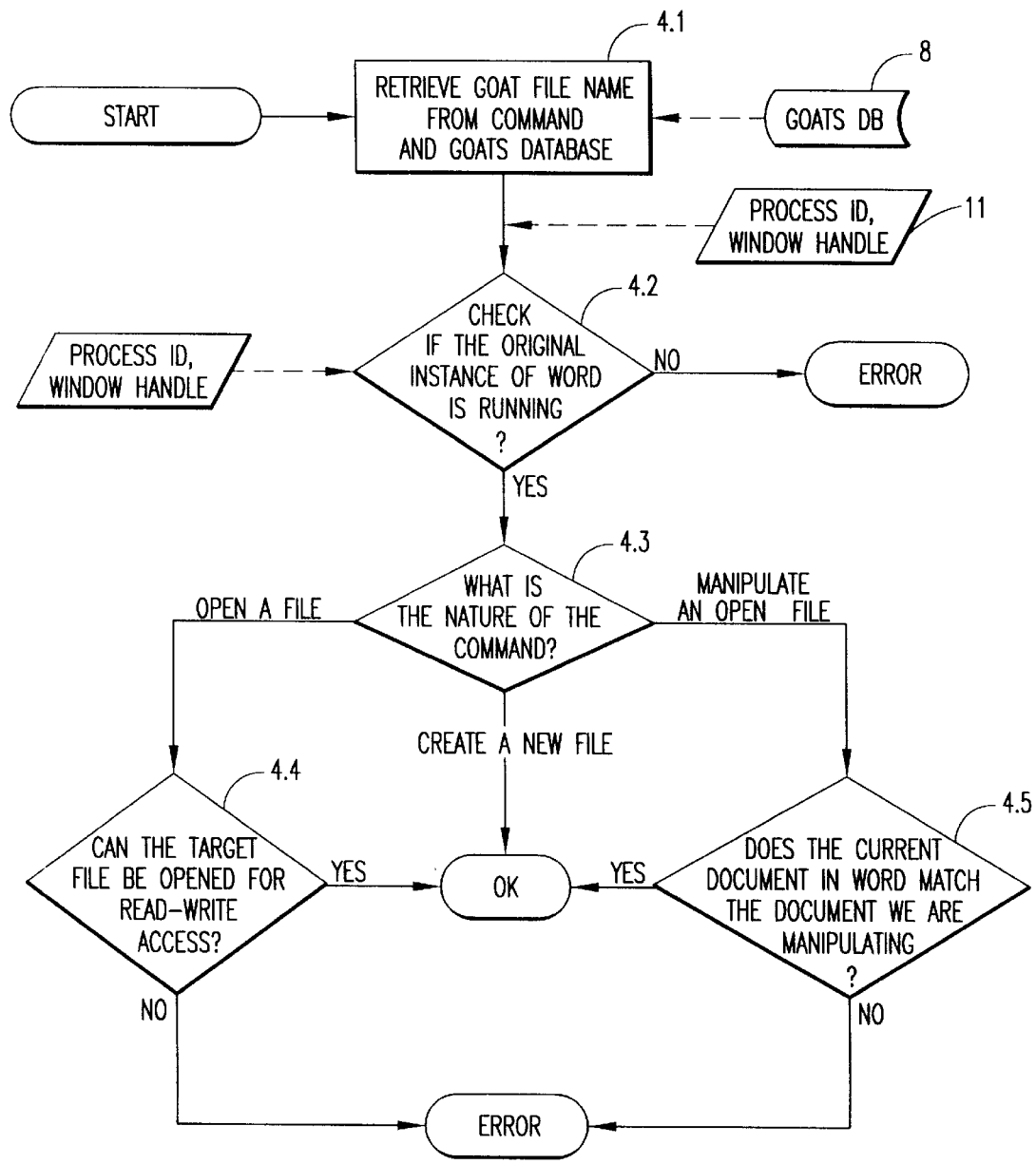
FIG.4  SANITY CHECK FOR A COMMAND

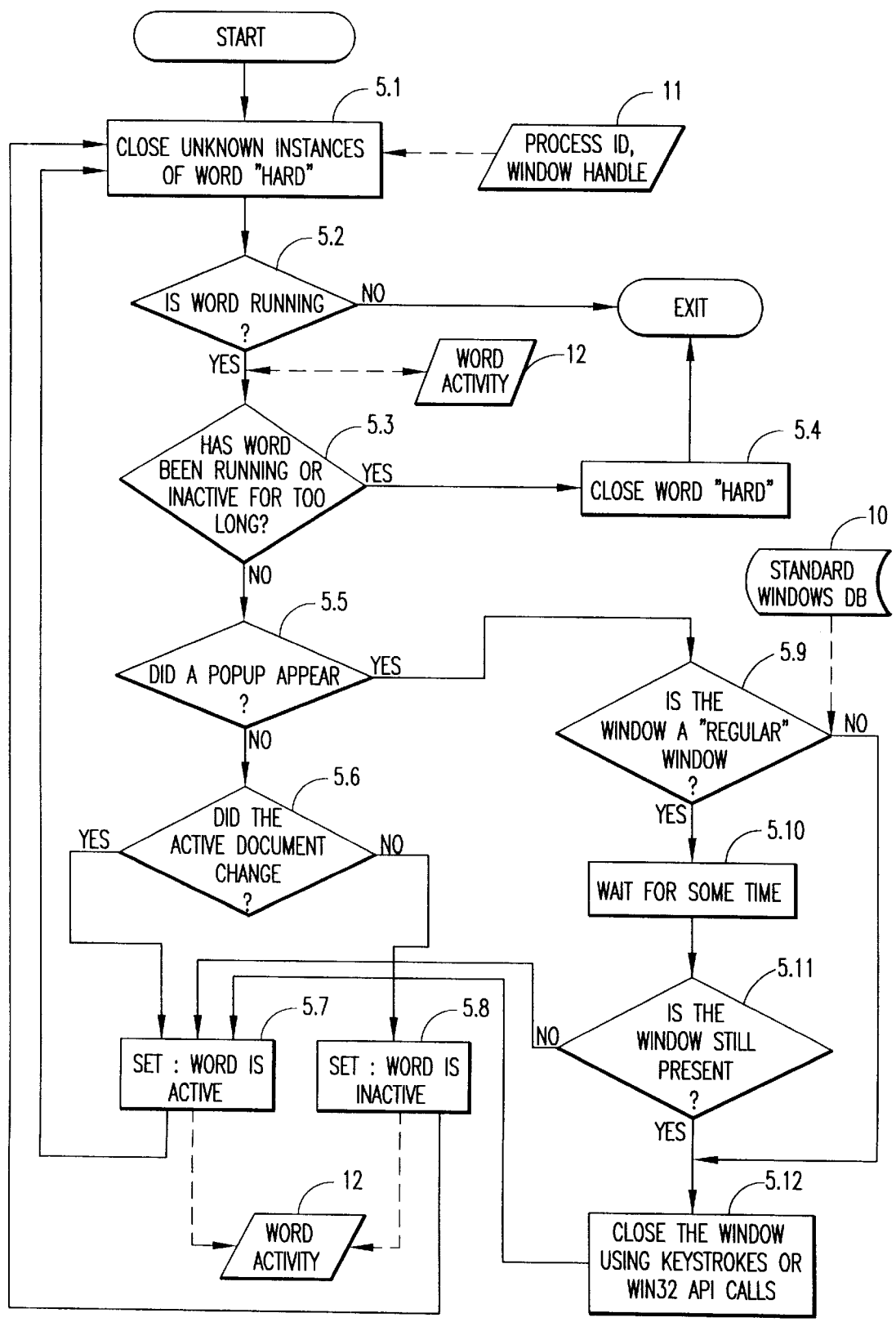
FIG.5 POPUP KILLER

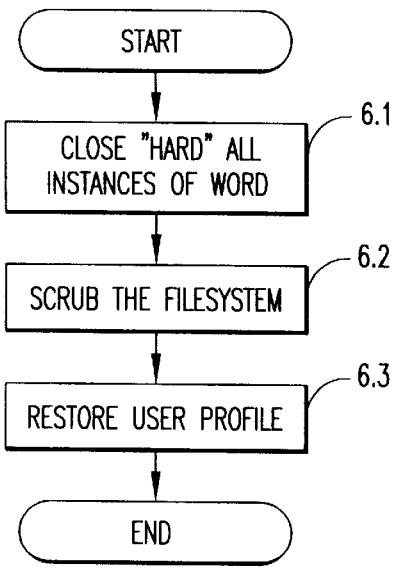
FIG.6  RESTORING THE SYSTEM
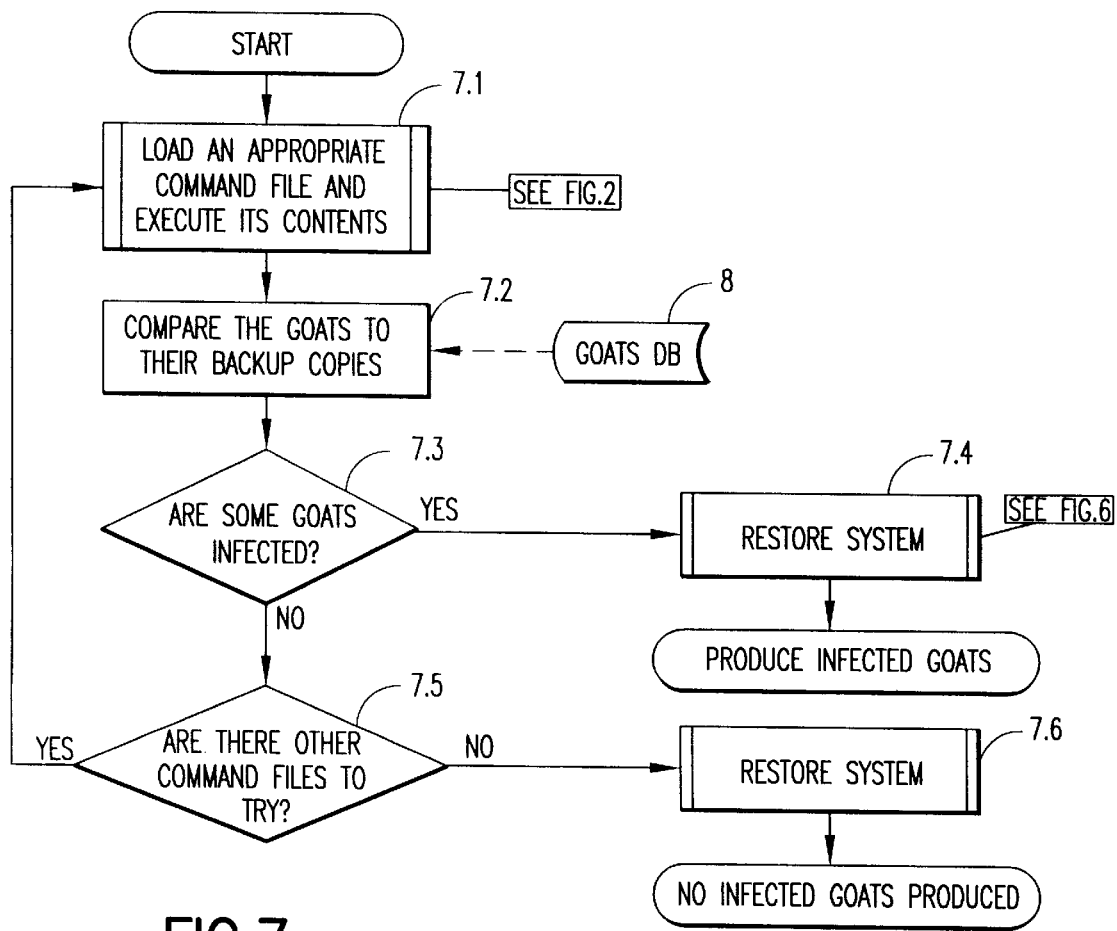
FIG.7  REPLICATION

AUTOMATED SAMPLE CREATION OF POLYMORPHIC AND NON-POLYMORPHIC MARCRO VIRUSES

CLAIM OF PRIORITY FROM A COPENDING PROVISIONAL PATENT APPLICATION

Priority is herewith claimed under 35 U.S.C. §119(e) from copending Provisional Patent Application 60/066,382, filed Nov. 21,97, entitled "Automated Sample Creation of Polymorphic and Non-Polymorphic Macro Viruses", by J. Boulay et al. The disclosure of this Provisional Patent Application is incorporated by reference herein in its entirety.

FIELD OF THE INVENTION

This invention generally relates to the automatic analysis of computer viruses and, in particular, to automatic methods and apparatus for creating a plurality of samples of a computer virus.

BACKGROUND OF THE INVENTION

The replication of a computer virus is an important first step before an analysis of the virus can begin. If the replication is correctly performed it provides the researcher with: (a) proof that a suspected virus is indeed a virus, and (b) samples of the virus, on which the researcher can base his or her analysis. For example, samples of the virus may be used to extract a "signature" of the virus that remains invariant over all instances of the virus.

Over the past several years a number of different classes of computer viruses have been recognized. A class of computer viruses of most interest to this invention is a class referred to as macro viruses, so named because they are intended to execute in an application's macro language. This is in contrast with binary file and bootsector viruses, which instead run in machine code directly under the machine's operating system.

Computer macro viruses require their target application to be loaded and active to function. These viruses are restricted in their functionality insomuch as the application restricts the operation of macros. In practice, the macro languages, the intended target of macro viruses, are hardly restrictive in the actions they allow macros to execute.

When a document or other data sample that is suspected of harboring a computer macro virus, hereinafter referred to simply as a 'virus' unless misinterpretation is deemed possible, is received in a computer virus laboratory for analysis, it is important to produce as many and as diverse samples as possible from the received suspected sample. Traditionally, this is done manually by loading the sample in its appropriate application and exercising the sample until it produces infected files (additional copies of itself). If this fails, the alleged virus is pronounced non-viral. If there is doubt about the analysis, the suspected virus can dissected by the researcher to determine by hand the nature of the virus.

If the suspected virus does replicate, it is important that enough samples be generated, and that the generated samples are of a divergent nature. This can be accomplished by various labor intensive processes. To achieve diversity, the researcher can repeat the replication process on various versions of the target application, including foreign language versions. This is an important consideration, as different versions of the same application program can produce different binary representations of the same virus. Likewise, the virus may take on different characteristics on different versions of the application, while still maintaining its viral nature.

Although it is typically not necessary to produce more than, for example, six samples per application version, in some cases more must be produced. In particular, if a large degree of divergence is observed between the text of the macros, it is necessary to produce an order of samples more to insure correct analysis and testing in later stages of the analysis.

One problem with conventional approaches is that the virus analysis can be a lengthy, labor intensive process if done correctly. If shortcuts are taken the number of samples generated may be insufficiently diverse, or just too few in number, which deficiencies will negatively affect the ensuing analysis.

A polymorphic macro virus is one that is capable of "mutation", that is, changing the virus code either during or after its execution in order to make it more difficult to compare with an original version of the virus.

Reference may be had to the following commonly assigned U.S. Patents for teaching various computer virus (not necessarily macro virus) detection, removal and notification techniques: U.S. Pat. No. : 5,440,723, issued Aug. 8, 1995, entitled "Automatic Immune System for Computers and Computer Networks", by Arnold et al.; U.S. Pat. No. : 5,452,442, issued Sep. 19, 1995, entitled "Methods and Apparatus for Evaluating and Extracting Signatures of Computer Viruses and Other Undesirable Software Entities", by Kephart; U.S. Pat. No. : 5,485,575, issued Jan. 16, 1995, entitled "Automatic Analysis of a Computer Virus Structure and Means of Attachment to its Hosts", by Chess et al.; U.S. Pat. No. : 5,572,590, issued Nov. 5, 1996, entitled "Discrimination of Malicious Changes to Digital Information Using Multiple Signatures", by Chess; and U.S. Pat. No. : 5,613,002, issued Mar. 18,1997, entitled "Generic Disinfection of Programs Infected with a Computer Virus", by Kephart et al. The disclosures of these commonly assigned U.S. Patents are incorporated by reference herein in their entireties, in so far as the disclosures do not conflict with the teachings of this invention.

OBJECTS AND ADVANTAGES OF THE INVENTION

It is a first object and advantage of this invention to provide a method and system for automatically replicating computer viruses, in particular, macro viruses.

It is another object and advantage of this invention to provide a method and system for automatically replicating a suspected macro virus such that a diverse population of infected files is produced to facilitate an analysis of the suspected macro virus, thereby increasing the probability of detecting and identifying the presence of a polymorphic macro virus.

SUMMARY OF THE INVENTION

The foregoing and other problems are overcome and the objects and advantages are realized by methods and apparatus in accordance with embodiments of this invention, wherein an automatic method is provided for generating a sufficient number of diverse samples of a suspected virus to permit an adequate analysis of the virus.

The method of this invention controls an application that is native to the virus in such a way as to produce samples with a high success rate. The method produces samples under various versions of the application that produce differing representations of the virus and/or different behavior of the virus, resulting in different text representation of the virus. In the case of the virus producing intentional stochastical variations in the virus text, the method identifies this case and produces additional samples.

Disclosed herein is both a system and a method for automatically generating at least one instance of a computer macro virus that is native to or associated with an application. The method includes steps of (a) providing a suspected virus sample; and (b) replicating the suspected virus sample onto a least one goat file, using a sequence of commands comprised of at least one of simulated user input, such as keystrokes, mouse clicks and the like, or interprocess communication (IPC) commands for exercising the goat file through the application to generate an infected goat file. A goat file is considered herein to be a file that is 'sacrificed' to the virus. The method may further include a step of (c) replicating the infected goat file onto a least one further goat file, using a sequence of commands comprised of at least one of simulated user input, such as keystrokes, or interprocess communication commands, to produce an additional infected goat file. The step of providing includes a step of determining attributes of the suspect virus sample, and wherein the steps of exercising use simulated user input or interprocess communication commands that are selected based at least in part on the determined attributes.

As a parallel process the steps of exercising include steps of detecting an occurrence of a window, such as a pop-up window that is opened by one of the application or the macro virus, and then closing the opened window such as by using at least one of simulated keystrokes or interprocess communication command(s). In this manner the replication process is not halted by a window that requires input from a user.

The steps of replicating each comprise a step of interpreting a plurality of scripts to generate a series of application commands such as application open, application close, and document manipulation commands.

The steps of replicating include a step of comparing an exercised goat file to a secure copy of the goat file to detect a modification of the goat file, such as a modification of existing macros or the creation of new macros in the goat file, and declaring such a changed goat file to be an infected goat file thereby generating an instance of the macro virus for subsequent analysis.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 is a logic flow diagram of a global macro virus replication process in accordance with this invention;

FIG. 2 is a logic flow diagram of a method for processing a command file;

FIG. 3 is a logic flow diagram of a method for the execution of a file manipulation command, which forms a part of the method of FIG. 2;

FIG. 4 is a logic flow diagram of a method for performing a sanity check of a command, which forms a part of the method of FIG. 3;

FIG. 5 is a logic flow diagram of a pop-up window killer routine which is started by and which runs in parallel with the method of FIG. 2;

FIG. 6 is a logic flow diagram of a method for restoring the system;

FIG. 7 is a logic flow diagram of a method for replicating a sample, which forms a part of the method shown in FIG. 1.

DETAILED DESCRIPTION OF THE INVENTION

Figure 8:
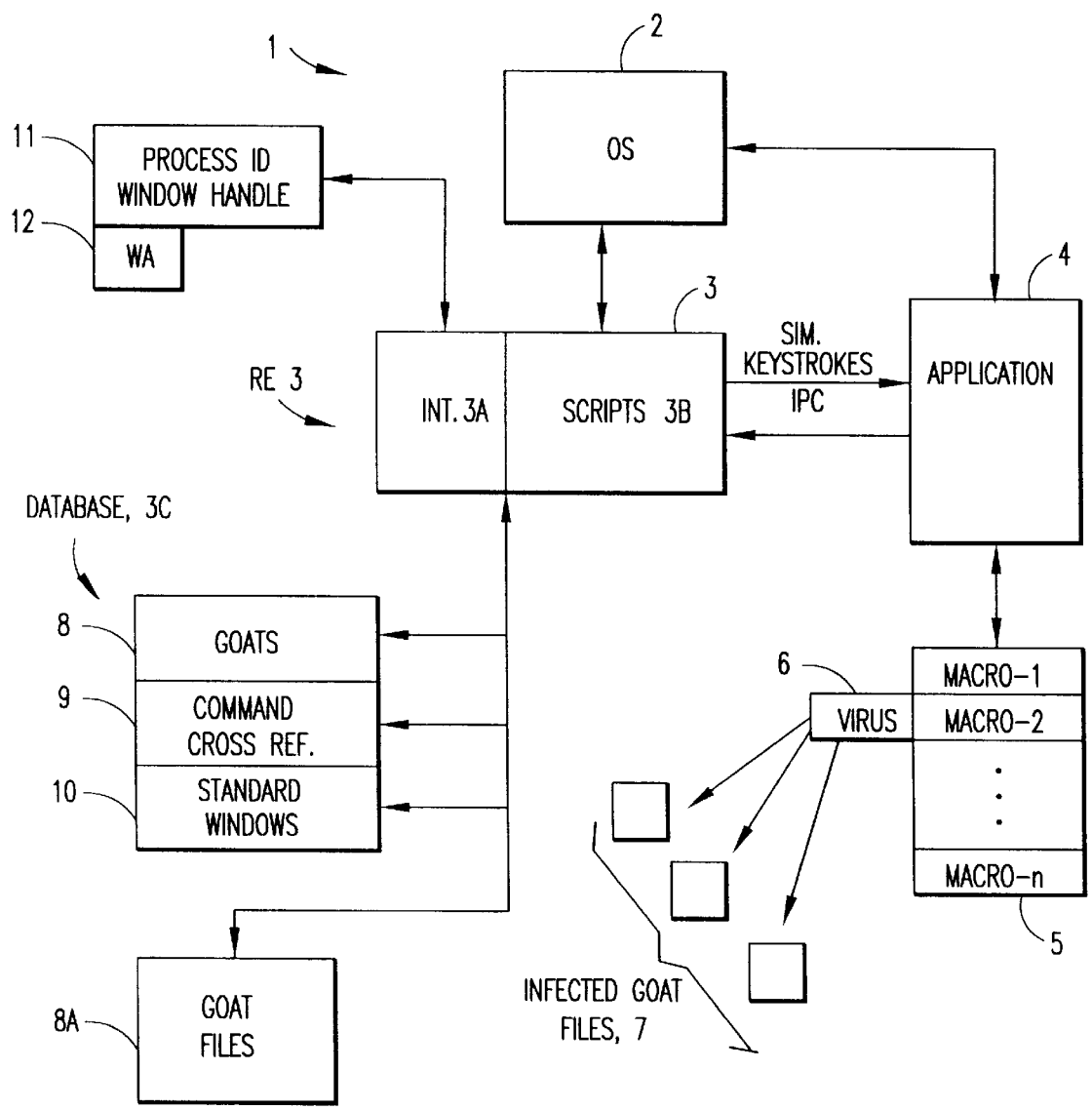
FIG. 8 is a high level block diagram of a sample replication system in accordance with the teachings of this invention.

In an exemplary embodiment of the invention an application of interest, i.e., one that supports a macro language subject to viral infection, is installed on a PC running under, by example, Microsoft Windows NT™. However, any operating system that offers the correct functionality to run the application may be used advantageously to implement this invention. A scripting language that is capable of sending Dynamic Data Exchange (DDE) and Object Linking and Embedding (OLE), both of which are examples of interprocess communication commands, and system commands, as well as sending simulated user input such as keyboard and mouse events, is preferably used to control the application. The application runs under the control of the script, which also insures the application is terminated if an error in the virus or any other error causes the application to abnormally terminate or "hang". The script also detects an occurrence of pop-up windows from the virus, or a case where the application must be closed in order for a replication engine (see FIG. 1) to continue executing correctly.

In general, the hardware environment is one that is capable of hosting the application and the operating system that the application is dependent on. The hardware might be an International Business Machines (IBM) Personal Computer with, by example, an Intel 80386 compatible central processing unit (CPU), or it could be an Apple Macintosh™ computer with a Power PC™ CPU. However, these are but examples, and it will be understood that the use of this invention is not limited to only these hardware embodiments, and further that any hardware platform capable of executing the application of interest may be advantageously used.

The teaching of this invention is described in the context of an application known as Microsoft Word, which is employed as the target of infection for the replication process. Again, this is not to be construed as a limiting case, as the teaching of this invention can be applied in an analogous way to other applications that use macro languages, such as Microsoft Excel™. Those skilled in the data processing arts will readily understand that the methods described in detail below can be applied to various applications in order to successfully replicate viruses written for that application.

The invention is embodied at least in part in a script that is used to control the application and monitor the system.

Suitable scripting languages are C, PERL, and Visual Basic™, as they allow access to the Microsoft Windows™ DDE application programming interface (API), and to the Microsoft Windows OLE API, as will the Microsoft Windows system interface that allows simulated keystrokes and mouse events to be sent to the application. However, those skilled in the art will understand that these are but examples of suitable scripting languages, and that other scripting languages may be advantageously used separately and in combination. The script may also be advantageously implemented as a set of scripts, as should be understood by those skilled in the art.

In the ensuing description the scripts form a part of a Replication Engine (RE).

Referring briefly to the conceptual block diagram shown in FIG. 8, a computer system 1 includes: an operating system (OS) 2, such as Microsoft Windows NT; the Replication Engine 3 which is comprised, in the preferred embodiment, of an interpreter 3A for the scripting language and the scripts 3B themselves; an application 4 of interest, such as Microsoft Word; and a data sample to be analyzed such as a document containing at least one and typically a plurality of macros 5 (macro-1, macro-2, . . . , macro-n), one of which is shown having an associated virus. The infected macro (in this case macro-2) is referred to herein as a macro virus 6 or simply as a virus 6.

The RE 3, in one aspect, operates to automatically simulate a user's interaction with the application 4 by interpreting in turn scripts representing individual ones of commands in a command file and generating simulated input, such as keystrokes, mouse activity and the like for exercising the application 4 and the macros 5 in an attempt to stimulate the macro virus 6 into exhibiting viral behavior.

Additionally, the RE 3 can use interprocess communication commands (specified in the command file) instead of simulated input, etc., where these fail to provide the desired result or where it would be otherwise advantageous. The commands of the command file may also represent a combination of simulated input and interprocess communication commands. A desired goal is the generation of additional, preferably diverse, samples of the virus 6, shown as a plurality of infected goat files 7. The infected goat files 7 can then be further analyzed, which is the desired result. The RE 3 attempts to provoke the virus 6 into replicating by executing commands that are known to trigger replication.

By example, in Microsoft Word, hereafter referred to simply as 'Word', the macros 5 can be divided into two classes of macros: automacros and standard macros. The automacros are run by Word automatically when Word is started (AutoExec), Word is shut down (AutoExit), Word opens a document (AutoOpen), Word closes a document (AutoClose), and when Word creates a document based on a template (AutoNew).

The automacros are very attractive to virus writers as they limit the amount and type of user action needed to trigger the infection mechanism to those operations that the user must perform when manipulating a document.

If a standard macro has the name of a built-in Word command, it is run when the user starts the command by clicking in a menu on an item associated with the command, or by typing the keyboard shortcut for that command.

For example, if a document with a FileSave macro is active in an English language version of Word, this macro will be run each time that the user clicks on Save in the File menu, or presses the Control and S keys. Standard macros can also be called by other macros, or can have a keyboard shortcut assigned to them.

In accordance with the teaching of this invention the replication process includes performing miscellaneous operations with several files, aimed at calling the standard macros of the virus 6 and triggering the automacros. These actions include: starting Word, exiting from Word, opening files, saving files, saving files with different names, closing files, creating new files, and writing text files.

The simulation of keystrokes is used in two ways. A first way is to simulate the typing of the shortcut keys associated with some Word commands that call or trigger the virus 6 macro(s) and thus make it replicate. For example, pressing the Control key and O calls the FileOpen macros of the virus 6 in English language versions of Word, if the virus 6 has such a macro. The second way is to send information required by some dialog boxes displayed by Word. By example, depressing Control and O typically causes a dialog box to appear, in which the user is expected to type the name and location of a file to be opened. The RE 3 waits for such windows to display, and then sends the required information to them by simulating keystrokes.

The keyboard keys are simulated either by sending special Window Messages to the dialog boxes through the Win32 API, or by using built-in functions provided by some programming languages.

The Data Dynamic Exchange (DDE) is used to send WordBasic instructions to Word, which then executes the instructions. In general, DDE is used in Microsoft Windows as a form of interprocess communications that uses shared memory to exchange data between applications. Applications can use DDE for one-time data transfers and for ongoing exchanges and updating of data. The use of DDE with the teaching of this invention enables two kinds of actions to occur: (a) forcing Word to directly execute some commands that generate errors when they are executed through the virus 6, and (B) navigating through a file and editing its contents.

With regard to the first type of action, when commands are sent through the DDE they are executed by the Word built-in commands, and do not trigger the standard macros. The automacros can be prevented from being triggered by sending a DisableAutoMacro DDE command before running the other command. Then, running DisableAutoMacro again enables the automacros.

These types of actions are useful in order to circumvent certain problems in macro viruses which would otherwise make the replication method fail. For example, a given macro virus 6, in English language versions of Word, may contain corrupt macros that generate errors when it is desired to perform a special action on a file, e.g., an open, save, or close. However, sending the open, save, or close command through the DDE enables a corrupt macro or macros to be bypassed, enabling the process to continue.

With regard to the second action, i.e., navigating through a file and editing its contents, it is noted that some WordBasic instructions enable the cursor to be moved to the end or the beginning of a file, which is useful when it is desired to add text to a goat file and to thereby better simulate the range of normal user behavior which the virus 6 may expect to observe. The same effect can be obtained using Object Linking and Embedding (OLE) commands, except that Word can be ordered to shut down through DDE, but not through OLE. As was noted above, both DDE and OLE are examples of possible interprocess communication commands.

However, any suitable type of interprocess communication may be used to implement the teachings of this invention.

As was noted above, the preferred embodiment of the RE 3 is comprised of the interpreter 3A for the scripting language and the scripts 3B themselves. Those skilled in the art will realize that the same effect could be accomplished differently. For example, one monolithic program could be used.

The preferred embodiment of this invention also employs a number of databases 3C. Still referring to FIG. 8, these databases include the following: (A) a goats database 8, which stores cross references between an alias and the active and backup copies of goat files 8A, such as documents, used in the replication process; (b) a command cross reference database 9, which cross references a command with the national language versions of the keystrokes and the DDE command; and (C) a standard windows database 10, which contains identification information for various regular dialog boxes and windows together with the appropriate keystrokes needed to interact with the windows. Memory locations are also employed for storing an application's process ID and window handle, referenced as block 11, as well as a Word Activity (WA) variable 12. The use of this stored data is described below.

The goats files 8A may be comprised of Word files that are significantly different from one another to diversify the results of sample creation and maximize the chances of infection. They may be of different types (documents, templates and global templates), and contain one or more macros or no macros. The documents may have different sizes, and may contain different text.

The RE 3 begins with a 'clean' system 1 and a suspected virus 6 sample, which will be referred to simply as a sample. Referring now to FIG. 1, at 1.1, the attributes of the sample are determined, for example the language and type of document (e.g., template or plain document). This information is useful in optimizing the replication process, and selecting the correct national language version for Word, keystrokes, and DDE commands. In some cases, this information may be provided with the sample, otherwise the information is derived in 1.1 by analyzing the sample.

The virus sample may be provided as one of different types of files. The manner in which the virus sample has to be loaded into the application or the sets of commands necessary to make it replicate may depend on its type. In this case, each type has special sets of replication commands associated to it.

For Word viruses, the virus sample may be a document template, a global template, or (for some versions of Word) a document. Documents are files that the user opens in the application and to which the user writes text. They may contain customizations (macros for example) for the most recent versions of Word. Document templates are files created by the user, in which the user can store customizations (macros for example). These customizations are active when the template is active. The user also can write text to templates. The global template is a special template in which Word stores customizations (macros for example) that are required to be active whenever Word runs. It is loaded automatically by Word on startup, without any user intervention. If the sample is a document template or a document, it will be opened once Word is running. If the sample is a global template, Word's global template is replaced with it before running Word.

The processing is slightly different for plain documents and document templates. In Step 1.2 the method determines if the sample type is known. If yes, replication proceeds in Step 1.3 (see FIG. 7). If the sample type is not known, an attempt is made at Step 1.4 to replicate the sample onto a document. If this is not successful in producing infected goat files, (Step 1.5) an attempt is made at Step 1.6 to replicate the sample as a global template. If this fails (Step 1.7) the sample is most likely not a virus 6 and is marked for manual analysis at Step 1.8.

A goat file may be identified as being infected by detecting a change or a modification of existing macros or the creation of new macros. For example, some viruses change files without infecting them, simply by modifying their text. One such virus is known as the Wazzu Word virus, which adds the word "wazzu" randomly in the text of a document. However, this virus also infects documents by copying to them a macro known as 'autoclose'. Continuing with this example, a particular goat file may be identified as being infected if the autoclose macro is found, where it did not previously exist, or if an already present autoclose macro is found to have been overwritten with the Wazzu Word virus autoclose macro.

If an infected goat file 7 is found to have been generated at Steps 1.9, 1.5 or 1.7, a determination is made at Step 1.10 if a sufficient number of infected goat files 7 have been produced to be analyzed. The actual analysis of the infected goat files 7 does not form a part of this invention, and is not discussed in any detail herein. The precise number of infected goat files 7 depends on the nature of the virus 6 and the methods used for analyzing same. In general, five or six infected goat files may suffice for analysis purposes, although more or less than this number may be used.

In order to produce further samples (and further generations of samples) it is preferred to use the infected goat file 7, as opposed to the original sample itself, to repeat the replication process. In this case one of the infected goat files is chosen at Step 1.12, and control returns to Step 1.3. The method then iterates through the current pool of infected goat file samples (Steps 1.3, 1.10, 1.11, 1.12) using the attributes that were derived in Step 1.1 or through the analysis made in Steps 1.4 and 1.6.

A failure of the sample to adequately replicate is determined by the lack of sufficient samples in Step 1.11. One likely cause of this is a damaged virus 6. However, this condition is preferably judged manually at Step 1.8. Likewise, if no infected goat files are found to have been produced in Steps 1.4 and 1.6 the manual analysis is indicated as being required.

As it is fundamentally impossible to determine if a given sample is a virus 6, if the process described in these embodiments fails, one cannot simply assume that the sample is not a virus, however unlikely. As such, manual analysis is required.

Reference is now made to FIG. 7 for a discussion of the replication process, as referred to in Steps 1.3, 1.4, and 1.6 of FIG. 1. Replication is comprised of loading a command file that matches the attributes of the virus 6 and running it in the interpreter at Step 7.1 (see FIG. 2). The individual commands of the command file are then interpreted in turn in an attempt to replicate the virus 6. After it has run, the method compares back-up copies of the goat files 8A to the active goats (7.2) using the goats database 8. The goats database 8 correlates the goat files 8A that are used in the replication process (active) with protected copies of same stored out of access from Word.

Tools are used to compare the macro regions of the goat files, which indicates whether a goat file may have been infected. If some of the goats are found to be infected at Step 7.3 the system is restored at Step 7.4 (see FIG. 6) and a return is made. If none of the goat files are found to be infected at Step 7.3, the method determines at Step 7.5 if a different command file exists that matches the attributes of the virus 6. If yes, control passes back to Step 7.1, otherwise the system is restored at Step 7.6 and a return is made with a 'no infected goat file' produced indication.

Referring now to FIG. 2, the command file interpreter 3A begins at Step 2.1 by loading the goats database 8, which also contains the aliases that are used in the command files to index the goat files 8A. Next it reads the first command at Step 2.2 and determines the nature of the command at Step 2.3. The command may be an ordinary command to manipulate a document, a start Word command, or a close Word command.

If the command is to start Word, control passes to Step 2.4 to close "hard" any currently running instances of Word. By closing "hard" it is meant that the command file interpreter 3A uses Windows API calls to kill the process, which is the most secure way of closing the process. Word is then started at Step 2.5 and its process ID and window handle are noted at Step 2.6 and are stored in memory block 11 at Step 2.7. A pop-up killer (see FIG. 5) is then started at Step 2.8 which uses the window handle of Word to locate the original copy of Word. This process, which runs in parallel to the main replication process, is responsible for removing any stray pop-up windows that may appear as a result of, typically, virus 6 activity, and that are not handled by the command file interpreter 3A itself.

If the command is determined to be a close Word command at Step 2.3, a "soft" close approach is first tried. At Step 2.9 the keyboard focus is set to the original Word instance, based on the previously stored process ID and window handle 11, and appropriate keystrokes are sent to the instance of Word to close same at Step 2.10. This method is used first in an attempt to better simulate normal user behavior, and allows any virus 6 that is expecting the receipt of these keystrokes to infect or complete infection.

If Word is determined to have been closed by this technique at Step 2.11, then the process is finished, and control passes to Step 2.18. If Word was not closed, an attempt is made at Step 2.12 to close Word using DDE to disable automacros and to then close Word. This approach is preferred in that some virus macros interfere with the correct termination of Word, while DDE allows Word to terminate naturally but avoids the interference from the macro virus. If Word is determined at Step 2.13 to be closed, control passes to Step 2.18. If Word has still not closed, then a "hard" close is performed at Step 2.14 (see Step 2.4).

If the command is determined to be an ordinary Word command at Step 2.3, control passes to Step 2.15 to execute the command (see FIG. 3) and then to Step 2.16 to determine if the name of the manipulated goat, which is determined from the command's arguments, has changed. If so, the goats database 8 is updated at Step 2.17, and control passes to Step 2.18.

The infection of document goats by the virus sometimes results in changes to the suffix of the goat file name, which may become 'dot' instead of 'doc'. If such a change occurs, the goats database 8 is updated at step 2.17, and the control passes to 2.18. If any other change occurs, for example from 'anydoc.doc' to 'document doc', the RE 3 assumes that some type of failure occurred and ignores the change.

At Step 2.18 the command file interpreter 3A makes a determination if another command exists. If yes, control passes back to Step 2.2 to execute the next command, otherwise control passes back to the calling routine.

Reference is now made to FIG. 3 for a description of the method to execute a file manipulation command in the Step 2.15 of FIG. 2. When interpreting a command the method employed at Step 3.1 retrieves the appropriate keystrokes from the command cross-reference database 9 and the attributes of the sample. The command cross-reference database 9 is comprised of a table (represented in row and column format) of keystrokes and DDE commands, where each column represents a version of Word and each row a command. The command cross-reference database 9 is used since different keystrokes are needed for different national languages and other versions of Word, as is the case for many programs with which the invention can be used. The DDE command is also cross-referenced for later use.

At Step 3.2 a plausibility (sanity) check of the command is made, i.e., if the command can still be executed correctly (see FIG. 4). If the check fails, the method proceeds to the next command. Otherwise, at Step 3.3 the keyboard focus is set to the Word instance and keystrokes are sent.

A determination is made at Step 3.4 if the command currently being processed expects a window. If yes, a check is made at Step 3.5 to determine if the expected window actually appears. If yes, control passes to Step 3.6 to send the required keystrokes to terminate the displayed window. At this time the window should have been removed, and a determination is made at Step 3.7 if the window is still present. If no, control passes to Step 3.8 to determine if the command succeeded, using the assertions that accompany most commands (an empty assertion is always true by default). If the window is determined to still be present at Step 3.7, control instead passes to Step 3.9 where a hard close of the window is performed. On the other hand, if the expected window did not appear at Step 3.5, or if the window appeared but had to be closed hard at Step 3.9, or if the assertions were determined to have failed at Step 3.8, control passes to Step 3.10 to retrieve the DDE equivalent to the command, disable automacros, send the command, and then enable automacros. A return is then made to process the next command.

A variety of techniques may be employed to determine the existence and state of windows. For example, the Win32 API offers many functions to manipulate windows. Some of these functions, such as FindWindows and FindWindowsEx, return a handle (an identification number) for a window that has special characteristics (title, type, process, etc.), if such a window exists. Another function, GetLastActivePopup, retrieves the handle of the last pop-up window created by a given process. Other functions return the properties of a window, given its handle.

In accordance with an aspect of this invention the pop-up killer uses such functions to determine if Word has created any pop-up windows, and to obtain the characteristics of a window (such as title and class) necessary to determine whether the window is a regular window or not.

The RE 3 can employ the same functions, but instead of determining if the window is a regular window, determines whether the window is an expected window.

Referring to FIG. 4, the sanity check (Step 3.2 of FIG. 3) itself involves a first Step 4.1 of retrieving the goat file name from its handle using the goats database 8, and checking at Step 4.2 if the original instance of Word is still running, using the pre-stored process ID and window handle 11. If this is not the case, a return is made with an error indication. If the original instance of Word is still running, the method proceeds to Step 4.3 to determine the nature of the command. If the command involves opening a file, Step 4.4 is executed where a determination is made if the target file can be opened for read and write accesses. If yes, a return is made with a success indication, otherwise a return is made with an error indication. If the command instead involves manipulating a file, control passes to Step 4.5 to determine if the document to be manipulated is the same as the document currently loaded in Word. The current document can be queried by using system calls or alternatively by interprocess communication commands. If yes, a return is made with a success indication, otherwise a return is made with an error indication. If the command instead involves creating a file, the method exits immediately with a success indication.

In the foregoing description references were made to restoring the system (e.g., Steps 7.4 and 7.6 of FIG. 7). The object of restoring the system is to clean the replication engine 3 of any traces of the virus 6. Referring now to FIG. 6, at Step 6.1 all instances of Word are closed "hard". At Step 6.2 that part of the file system that Word has access to is "scrubbed" by removing all extra files and replacing any changed files with backup copies. Finally, at Step 6.3 the system user profile is restored to its original state.

A description is now made of a presently preferred technique for handling pop-up windows. When the virus' host application is run by the main replication process, some dialog boxes and pop-up windows can appear. These windows can be of various types. By example, "standard" windows are created by the application to require some information in response to a command (for example, in the U.S. English version of Word the Open dialog box appears when a user chooses to open a file from the file menu, or when the user presses the Control and O keys). In another example, windows can be created by the virus 6. These windows require an intervention from the user (clicking on a button or pressing some keys) and would otherwise stop the automatic execution of the RE 3.

If the window is a standard window, the main replication process of the RE 3 has access in the standard windows database 10 to the information required by the window to close same, and can send the information to the window using, for example, simulated keystrokes as described above. However, if the window is of viral origin, or is a standard that has failed to close, it is necessary to close the window to enable the automatic replication process to proceed. The pop-up killer routine (started at Step 2.8 of FIG. 1) that runs in parallel with the other operations of the RE 3 is responsible for closing such windows.

The pop-up killer is also responsible for two other tasks whose purpose is to prevent the RE 3 from hanging. These other tasks are killing (terminating) unknown instances of Word, if some are found to running, and killing Word if it is found to be hanging. In the context of this invention Word is considered to be inactive when it consistently fails to open documents, or close the current document. The RE 3 can become aware of this condition by measuring how long the current document has been open, or for how long no document has been open.

Further in this regard, if Word is hanging it no longer reacts correctly to the commands sent by the RE 3 By example, when the RE 3 sends a DDE command to Word it waits for a signal from the OS 2 indicating that the application received the command. If Word is hanging the signal is not sent, and the RE 3 would wait indefinitely unless interrupted by a timer or some other mechanism. However, if Word is not running then an error code is immediately sent back to the RE 3 from the OS 2, which can then resume its operation. As was discussed previously, these various cases are handled by the scripts that form the command file executed by the RE 3.

The pop-up killer routine is initiated when Word is first started in Step 2.8 of FIG. 1. Referring to FIG. 5, it is comprised of a loop that starts at Step 5.1 with a close of all unknown instances of Word (i.e., instances of Word that do not have a corresponding process ID and window handle 11). A determination is then made at Step 5.2 if the desired instance of Word is still running. If not, the routine exits. If the desired instance of Word is still running, a determination is made at Step 5.3, using the Word Activity variable 12, whether Word has been running or has been inactive for more than some predetermined period of time. This step involves checking and updating hardware or software timers for Word activity and total running time of Word. If Word has been running too long or has been inactive for too long, a hard close is made at Step 5.4, and the routine terminates, otherwise a determination is made at Step 5.5 for the existence of pop-up windows. If there are none, a check is made at Step 5.6 if the active document has changed, in which case the Word Activity variable 12 is set at Step 5.7 for indicating that Word is active. Otherwise, the Word Activity variable 12 is set at Step 5.8 for indicating that Word is Inactive. In either case control passes back to the top of the loop at Step 5.1. The Word Activity variable 12 is used at Step 5.3, as described above.

If a pop-up window is determined to have appeared at Step 5.5, control passes to Step 5.9 were a determination is made, using one or more of the above described window-related functions, whether the pop-up window is a standard window as listed in the standard windows database 10. If the pop-up window is listed, an assumption is made that the existence of the pop-up window is the result of the main execution process. In this case a delay is made at Step 5.10 for the window to close. At Step 5.11 a determination is made if the pop-up window is still present. If it is the window is closed hard, as it is also closed if the pop-up window is not found in the standard windows database 10 at Step 5.9. Control then passes to Step 5.7. Closing the popup window hard may be an indication that the pop-up window was not expected to appear at the time it appeared, or that the pop-up window could not be closed in a normal fashion. If the window is instead found in Step 5.11 to have closed "naturally" after the time delay of Step 5.10, control passes to Step 5.7 to set the Word Activity variable 12 to indicate Word activity.

It should be apparent that the teaching of this invention provides a novel and useful technique and system for replicating macro viruses through the use of simulated user input, such as keystrokes, mouse clicks and the like, as well as through the use of interprocess communication commands and system level commands that are not available to a typical user.

While the invention has been particularly shown and described with respect to preferred embodiments thereof, it will be understood by those skilled in the art that changes in form and details may be made therein without departing from the scope and spirit of the invention.

What is claimed is:

1. A method for automatically generating at least one instance of a computer macro virus associated with an application, comprising steps of:

providing a suspect macro virus sample; and replicating the suspect macro virus sample onto a least one goat file, using at least one of simulated user input or interprocess communication commands for exercising the goat file through the application, to generate an infected goat file.

2. A method as in claim 1, and further comprising a step of:

replicating the infected goat file onto a least one further goat file, using at least one of simulated user input or interprocess communication commands, to generate an additional infected goat file.

3. A method as in claim 2, wherein the step of providing includes a step of determining attributes of the suspect macro virus sample, and wherein the steps of exercising use simulated user input or interprocess communication commands selected based at least in part on the determined attributes.

4. A method as in claim 2, wherein the steps of exercising include steps of:
 detecting an occurrence of a window that is opened by one of the application or the macro virus; and
 using at least one of simulated user input or interprocess communication commands for closing the opened window.

5. A method as in claim 2, wherein the steps of replicating each comprise a step of interpreting a plurality of scripts to generate a plurality of application commands.

6. A method as in claim 5, wherein the application commands are comprised of application open, application close, and document manipulation commands.

7. A method as in claim 2, wherein the steps of replicating include a step of comparing an exercised goat file to a secure copy of the goat file to detect the creation of new macros or the modification of existing macros in the exercised goat file, and declaring a changed goat file to be an infected goat file.

8. A system for automatically generating at least one instance of a computer macro virus associated with an application, comprising a memory for storing the application, a suspect sample containing at least one macro, a replication engine comprising a plurality of scripts representing an application command file and a command interpreter, a plurality of goat files, and databases including a database for storing at least information expressive of predetermined user input required for implementing certain of said commands; said replication engine operating to interpret said command file for generating a plurality of application commands, and for sending at least one of corresponding predetermined simulated user input or interprocess communication commands for exercising a goat file through the application, said system further comprising means for comparing an exercised goat file to a secure copy thereof to detect the creation of new macros or the modification of existing macros in the exercised goat file, and for declaring a modified goat file to be an infected goat file containing a replicated macro virus.

9. A system as in claim 8, wherein said replication engine is further operable for replicating an infected goat file onto a least one further goat file, using at least one of corresponding predetermined simulated user input or interprocess communication commands, to provide a further generation of the macro virus.

10. A system as in claim 9, wherein the macro virus is a polymorphic macro virus, and wherein the further generation of the macro virus differs from the replicated macro virus.

11. A system as in claim 8, and further comprising means for determining attributes of the suspect virus sample, and wherein said interpreter selects user input or interprocess communication commands based at least in part on the determined attributes.

12. A system as in claim 8, and further comprising means, operating in parallel with said interpreter, for detecting an occurrence of a window that is opened by one of the application or the macro virus, for determining in accordance with a windows database whether the opened window is a standard window, and for using at least one of simulated user input or interprocess communication commands for closing the opened window.

13. A system as in claim 8, wherein the application commands are comprised of application open, application close, and document manipulation commands.

14. A computer program stored within a memory device for execution by a computer that comprises an operating system and an application of interest, said computer program directing said computer to automatically generate at least one instance of a computer macro virus that is associated with the application of interest, and comprising a program portion that is responsive to a suspect macro virus sample for replicating the suspect macro virus sample onto a least one goat file, said program portion employing at least one of simulated user input or interprocess communication commands for automatically exercising the goat file with the application of interest to attempt to generate an infected goat file.

15. A computer program as in claim 14, and further comprising a program portion for automatically detecting an occurrence of an opening of a window, and for automatically closing the opened window.

16. A computer program as in claim 15, wherein the program portion automatically closes the opened window by performing a soft close.

17. A computer program as in claim 15, wherein the program portion automatically closes the opened window by performing a hard close.

18. A computer program as in claim 14, and further comprising a program portion for automatically identifying a presence of an infected goat file, and a program portion for using the identified infected goat file to attempt to generate another instance of an infected goat file.

19. A computer program as in claim 14, wherein the suspect macro virus sample is comprised of one of a document template, a global template, or a document.

20. A computer program as in claim 14, and further comprising a program portion for automatically closing any instances of the application of interest that may be running, and for automatically opening at least one instance of the application of interest.

* * * * *